United States Patent [19]
Umeda et al.

[11] Patent Number: 6,124,660
[45] Date of Patent: *Sep. 26, 2000

[54] AC GENERATOR FOR VEHICLES

[75] Inventors: Atsushi Umeda, Okazaki; Tsutomu Shiga, Nukata-gun; Shin Kusase, Obu, all of Japan

[73] Assignee: Denso Corporation, Kariya, Japan

[*] Notice: This patent is subject to a terminal disclaimer.

[21] Appl. No.: 09/084,291

[22] Filed: May 26, 1998

[30] Foreign Application Priority Data

| May 26, 1997 | [JP] | Japan | PCT/JP97/1778 |
| Oct. 24, 1997 | [JP] | Japan | 9-309731 |
| Apr. 21, 1998 | [JP] | Japan | 10-128341 |

[51] Int. Cl.⁷ ............ H02K 3/34; H02K 3/04; H02K 9/00
[52] U.S. Cl. .......... 310/215; 310/201; 310/203; 310/208; 310/62
[58] Field of Search .................. 310/215, 201, 310/202, 203, 208, 260, 214, 62, 63, 59, 270, 194

[56] References Cited

U.S. PATENT DOCUMENTS

| 1,822,261 | 9/1931 | Apple | 310/201 |
|---|---|---|---|
| 1,826,295 | 10/1931 | Apple | 310/201 |
| 2,928,963 | 3/1960 | Bertsche et al. | 310/168 |
| 3,334,255 | 8/1967 | Peters | 310/215 |
| 3,444,407 | 5/1969 | Yates | 310/214 |
| 3,749,950 | 7/1973 | Lenz | 310/45 |
| 4,275,321 | 6/1981 | Shimamoto et al. | 310/59 |
| 4,870,307 | 9/1989 | Kitamura et al. | 310/54 |
| 5,093,591 | 3/1992 | Kitamura et al. | 310/62 |
| 5,095,235 | 3/1992 | Kitamura | 310/68 D |
| 5,097,167 | 3/1992 | Kanayama et al. | 310/201 |
| 5,691,590 | 11/1997 | Kawai et al. | 310/180 |
| 5,742,498 | 4/1998 | Taniguchi et al. | 363/145 |
| 5,751,088 | 5/1998 | Mukai et al. | 310/239 |
| 5,763,968 | 6/1998 | Hayashi et al. | 310/51 |
| 5,777,407 | 7/1998 | Ishida et al. | 310/64 |
| 5,778,572 | 7/1998 | Lukavich et al. | 37/460 |
| 5,821,652 | 10/1998 | Hyypio | 310/83 |
| 5,864,193 | 1/1999 | Katoh | 310/214 |
| 5,955,810 | 9/1999 | Umeda et al. | 310/208 |

FOREIGN PATENT DOCUMENTS

| 3704780A1 | 11/1988 | Germany . |
|---|---|---|
| 48-442 | 1/1973 | Japan . |
| 50-47102 | 4/1975 | Japan . |
| 59-159638 | 9/1984 | Japan . |
| 62-272836 | 11/1987 | Japan . |
| 63-274335 | 11/1988 | Japan . |
| 64-5340 | 1/1989 | Japan . |
| 3-159549 | 7/1991 | Japan . |
| 3-235644 | 10/1991 | Japan . |
| 7-303351 | 11/1995 | Japan . |
| 8-205441 | 8/1996 | Japan . |
| 8-298756 | 11/1996 | Japan . |
| 84/01478 | 4/1984 | WIPO . |
| 92/06527 | 4/1992 | WIPO . |

OTHER PUBLICATIONS

Patent abstracts of Japan vol. 016, No. 018 (E–1155), Jan. 17, 1992 & JP 03 235644 A (Hitachi Ltd; Others: 01), Oct. 21, 1991.

F. Yeaple: "New designs for aluminum motors include fool–proof connectors" Product Engineering, vol. 45, No. 12, Dec. 1974, pp. 19–22, XP002086191.

Sears et al., University Physics, sixth edition, Feb. 1984, pp. 539–540.

*Primary Examiner*—Elvin Enad
*Assistant Examiner*—Dang Dinh Le
*Attorney, Agent, or Firm*—Pillsbury Madison & Sutro LLP

[57] ABSTRACT

An AC generator for vehicles includes a field rotor, a stator disposed around said field rotor and a frame for supporting the rotor and the stator. The stator has a laminated core having a plurality of slots, aluminum conductors housed in the slots, and an electric insulator. The aluminum conductor is constituted by in-slot portion and a crossover portion for connecting an in-slot portion in one slot to another in-slot portion in a different slot to provide a winding as a whole. The frame is provided with a plurality of windows substantially in a whole periphery thereof at portions encircling the crossover portions and substantially in an outer diametrical direction opposite to the crossover portions.

11 Claims, 8 Drawing Sheets

AC GENERATOR FOR VEHICLES

CROSS REFERENCE TO RELATED APPLICATION

The present application is based on and claims priority from PCT application PCT/JP97/1778 filed on May 26, 1997, and Japanese Patent Application 10-128341 filed on Apr. 21, 1998, and Japanese Patent Application Hei 9-309731 filed on Oct. 24, 1997, the contents of which are incorporated herein by reference.

BACKGROUND OF THE INVENTION

1. Field of the Invention

The present invention relates to an AC generator for vehicles loaded on cars, trucks and the like.

2. Description of the Related Art

Recently, the engine and the whole electric appliances come close to the road surface due to the slant nosing for reducing the vehicle running resistance and improving the visibility, and the water-splashing conditions caused by splashing water from tires during the running have been severe. Further, in the cold district, a large amount of salts such as calcium chloride and sodium chloride are scattered for the purpose of preventing the road from freezing in a winter season, and the salts stay on the road surface as electrolytic solutions, which are dragged in during the running, resulting in harsher corrosive environment of the engine. Since the vehicular generator loaded on the engine is exposed to the harsh environment as described above, an inconvenience of corrosion caused by water-splashing and salts sometimes occurs.

On the other hand, with the tendency of a narrower engine room, there is no room for a loading space for the vehicular generator. Further, the reduction in weight for improving fuel cost and the enhancement of generation performance resulting from an increase in such as electric load of safety control apparatus and so on have been demanded. Needless to say, lower cost is demanded.

That is, an AC generator for vehicles which is excellent in resistance to corrosion, small in size, light in weight, and low in cost has been necessary. In this case, the stoppage of the generation of the electrical energy due to the corrosion is mainly caused by the fact that in the step of mounting of a stator coil into a slot of a stator core, an insulating film on the surface of the stator coil is damaged by mechanical friction or the like, and when particularly salt water which is an electrolytic solution is splashed on the damaged portion, it reacts with copper that is an electric conductor of the coil to produce a conductive compound. When this reaction progresses, separation between the film and the copper is further accelerated, a short-circuit between the stator core and the coil and between the coils occurs, resulting in an occurrence of lowering of output and local rapid heat generation, finally leading to a breakage of the stator coil.

For solving the problem, it is contemplated that the film of the stator coil be increased in thickness, and the damage resistance be improved. Further, in the impregnation process by way of resin generally carried out for the resistance to vibration and the environmental effect after the stator coil has been wound, thickly coating of impregnated resin is generally used. Further, as disclosed in Japanese Patent Application Laid-Open No. Hei 3-235644, a drip proof cover is mounted on the cooling air take-in side to cut off a path entering water directly from the outside.

When the film of the stator coil is increased in thickness, not only the material cost of the film increases but also the number of coating of the film increases. Therefore, the number of fabrication steps of the coil material increases so that the cost of the stator coil considerably increases. Further, since the occupied area ratio in the slot increases by the portion in which the film becomes thick, an occurrence of damage of the film when the stator coil is inserted and mounted increases, failing to improve the anti-corrosion performance as desired. Further, if the film is increased in thickness to provide the same space factor, a sectional area of copper becomes narrow so that the electric resistance value of the stator coil rises, thus lowering the output. There are also problems of a rise in temperature resulting from deterioration of heat radiation of the stator coil itself, and the lowering of output therefrom. When the area of the slot is enlarged so as to provide the same space factor in order to compensate for the lowering of output, the physique cannot but increase in order to secure a magnetic path section in each part of the stator core in terms of the magnetic circuit, which cannot attain the demand for miniaturization.

It is needless to say that when the film excellent in resistance to damage is provided, the cost rises. However, the generator which is high in cost ratio of the stator coil occupied by the entire constituent product is greatly affected by the rise of cost as compared with other constituent products. If the film is increased in thickness, when the heat resistance to the film is improved with respect to the rise of temperature, the cost further increases.

Also in the case where the impregnated resin is coated thickly, needless to say, there poses problems of an increase in material cost, an increase in production cost due to the increase of the steps, and the lowering of output due to the rise of temperature.

Figure 4A:
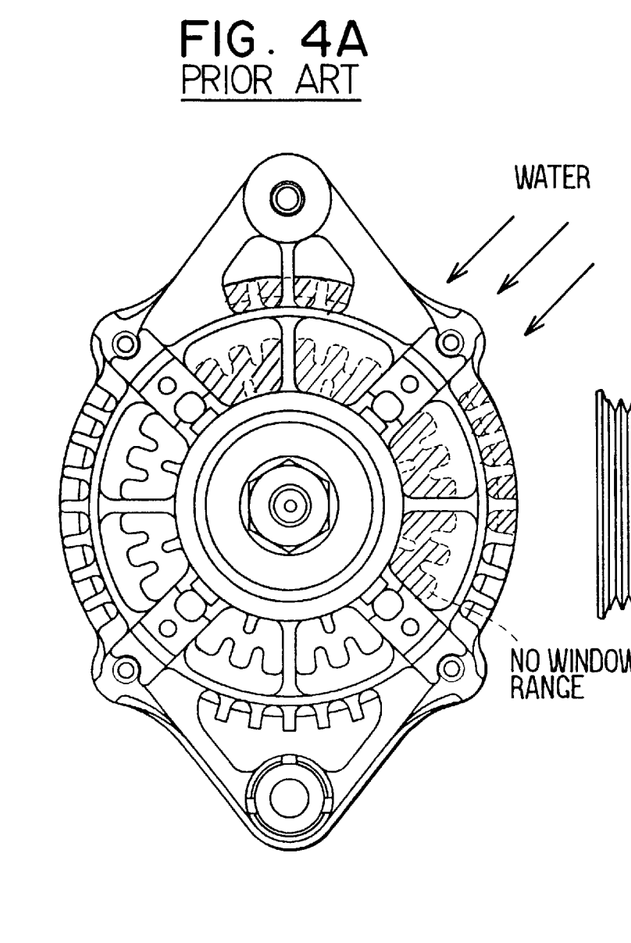
FIGS. 4A and 4B show an example of a window blocking frame for shielding water-splashing in prior art, FIG. 4A being a front view, and FIG. 4B being a side view.
Figure 4B:
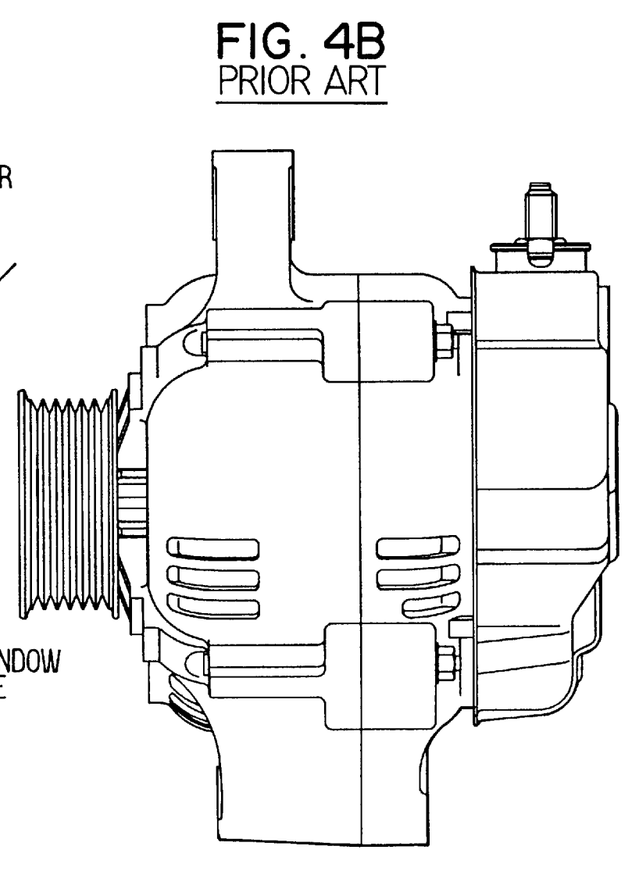

Further, in the method disclosed in Japanese Patent Application Laid-Open No. Hei 3-235644, in a recent small and high-output vehicular generator, a fan is provided on the side of a rotor, by which rotation cooling air is taken therein, and a stator coil is cooled by utilizing air discharged through a window provided diametrically of a frame, as described in the embodiment shown in FIG. 11 thereof. That is, since the stator coil is positioned near the window for ventilation provided diametrically of the frame, water or salt water from the diametrical outside of the generator can easily reach the periphery of the stator. Therefore, it is contemplated that a drip-proof cover is also mounted externally of the window provided diametrically of the frame, or a window covered by water out of the windows provided diametrically of the frame is blocked as shown in FIGS. 4A and 4B. In any case, however, the ventilation resistance increases and the quantity of cooling air reduces, and an escape of hot air after heat generating parts such as a stator coil, a rectifier is impeded, resulting in rising considerably a temperature of the whole generator. Further, the addition of the drip proof cover increases materials and production cost due to an increase in number of parts.

The present invention solves the above-described problem of prior art. An object of the present invention is to provide an AC generator for vehicles which prevents corrosion caused by water-splashing from outside to achieve a long service life, is excellent in cost, is free from a new problem such as a rise of temperature, and can realize miniaturization and reduced weight.

SUMMARY OF THE INVENTION

For achieving the aforementioned object, according to the present invention, there is provided a generator having an electric conductor of a stator coil made of aluminum whereby even if salt water or the like is splashed on the generator, a conductive compound is not produced, and accordingly, a sufficient cooling ventilation is secured not to lower output, and reduction in weight is achieved.

According to a first aspect of the present invention, there is provided an AC generator for vehicles comprising, a field rotor, a stator disposed around the rotor, and a frame for supporting the rotor and the stator, characterized in that the stator has a laminated core having a plurality of slots, aluminum electric conductors housed in the slots, and an electric insulator, the electric conductor is constituted by a crossover portion for connecting in-slot portions in different slots to provide a winding as a whole, the frame is provided with a plurality of windows substantially in the whole periphery thereof at portions encircling the crossover portions of the electric conductor from the outer periphery and substantially in the outer diametrical direction opposite to the crossover portions.

With the above-described arrangement, in the case where electrolytic water droplets containing salt or the like reach the stator coil, even if the electric conductor is encroached by corrosion, a conductive compound is not precipitated and produced because the electric conductor of the stator coil is made of aluminum. For this reason, even if the corrosion of the stator coil progresses due to the water-splashing onto the stator coil, it is possible to prevent a short-circuit between the coil and the stator core and between the coils. Thereby, it is possible to enlarge a sectional area of the electric conductor, that is, increase an occupied area ratio. Further, it is not necessary to block the frame window in the direction of water-splashing and the drip proof cover is not necessary. Since the plurality of windows can be provided substantially over the entire periphery in the outer diametrical direction of the crossover portion of the stator coil so that the ventilation path of cooling air can be sufficiently secured, no considerable rise in temperature of the whole generator occurs, and the stator coil can be sufficiently cooled. From the foregoing, the stator coil can be highly cooled, and the sectional area of the electric conductor can be enlarged, thus enabling the use of aluminum which is higher in intrinsic electric resistance as compared with copper. Further, it is not necessary to increase the physique in order to secure the output, and the reduction in weight can be realized due to a difference in specific gravity between copper and aluminum. Moreover, copper is changed to aluminum whereby material cost can be considerably reduced, and it is not necessary to increase the thickness of the film, to thickly coat the impregnated resin, and to add the drip proof cover, thus enabling considerable reduction in cost.

According to a second aspect, there is provided an AC generator for vehicles according to the first aspect, wherein the crossover portion of the stator coil is arranged so as to house cooling air from the inner periphery of the stator. Since the drying of water-splashing to the crossover portion of the stator is accelerated, there is an effect of suppressing the progress of corrosion. Further, the increase in output caused by the lowering of temperature of the stator coil is enabled by air impinging on the crossover portion.

According to a third aspect, there is provided an AC generator for vehicles according to the first or second aspect, wherein a fan is provided at least on one side out of both ends in an axial direction of the rotor opposite to the stator. Thereby, the quantity of air for discharging cooling air sucked from the axial outside in a diametrical direction can be increased to further enhance cooling of the stator coil made of aluminum material to increase the output.

According to a fourth aspect, there is provided an AC generator for vehicles according to any one of the first to third aspects, wherein an occupied area ratio of a sectional area of the electric conductor housed in the slot with respect to a sectional area of the slot of the stator is not less than 50% and less than 80%.

Figure 3A:
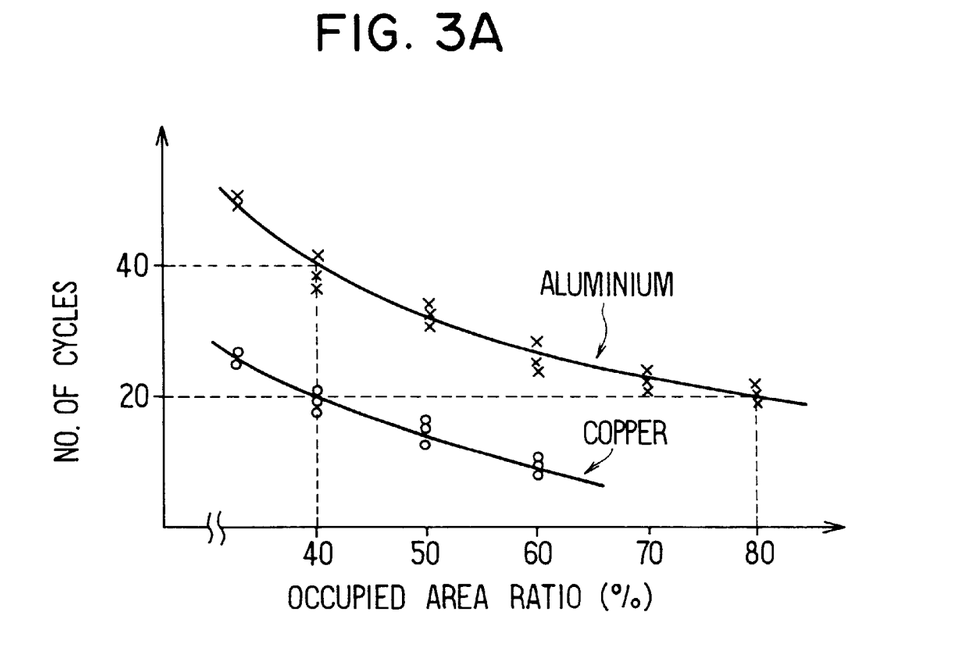
FIG. 3A shows the results of a salt water atomization test with respect to an occupied area ratio.

Conventionally, it is general that the occupied area ratio is about 40%. However, as shown in FIG. 3A, in the present invention in which the electric conductor is made of aluminum, the intrinsic electric resistance is higher than copper. However, as previously mentioned, the cooling property of the electric conductor is further improved by the reduction in resistance resulting from enlargement of sectional area of the conductor, the considerable enhancement of cooling performance resulting from the securing of a cooling ventilation path, and the good heat transfer from the stator coil to the stator core resulting from enhancement of the occupied area ratio. Therefore, if the occupied area ratio is set to not less than 50%, the same output as the case where copper is used is obtained.

Further, in the case where the occupied area ratio is further increased, in the life test under the water atomization condition, in the conventional copper electric conductor, the damage produced in the insulating film in the step of inserting and mounting it on the stator slot increases, and a conductive compound is produced due to the corrosion from the portion to shorten the life. However, the electric conductor is made of aluminum whereby the conductive compound due to the corrosion is not produced, thus securing the long service life. FIG. 3A shows the number of cycles till abnormality is generated in the test of applying a voltage to the stator coil under the salt water atomization condition in accordance with JIS-Z-2371. The abnormality in the conventional stator using copper for the electric conductor is due to poor pressure resistance caused by the short-circuit, whereas the abnormality of the present invention using aluminum for the electric conductor results from the fact that aluminum is solved out, and as a result, the electric conductor becomes narrowed and the electric resistance of the stator rises. In FIG. 3A, the case where the conventional electric conductor is made of copper and the occupied area ratio is 40%, the average number of cycles till trouble occurs is 20 cycles, but in the case where the electric conductor is made of aluminum, the occupied area ratio in which trouble occurs in 20 cycles is 80%.

According to the present invention, the occupied area ratio is not less than 50% but less than 80% to enable the provision of a generator which is excellent in output as well as the resistance to environmental effect as compared with prior art.

According to a fifth aspect, there is provided an AC generator for vehicles according to any one of the first to fourth aspects, wherein the electric conductor is at least partly a substantially rectangular shape along the shape of the slot. Thereby, the occupied area ratio is raised to increase a sectional area of a winding, and as a result, the resistance to the winding can be reduced to enable higher output. Even the occupied area ratio is not less than 50%, fabrication is easy, and the fabrication cost can be reduced.

According to a sixth aspect, there is provided an AC generator for vehicles according to any one of the first to fifth aspects, wherein the electric conductor is divided into two layers, i.e., an outer layer positioned in the inner part of the slot and an inner layer positioned at an inlet, at least a pair of which are disposed, and the conductors of the inner and outer layers of different slots are connected in series.

Thereby, since the interference between different phases in the crossover portion of the electric conductor can be avoided, the electric conductor can be easily disposed in the inner part of the slot to achieve the higher output due to the higher space factor.

According to a seventh aspect, there is provided an AC generator for vehicles according to any one oft first to sixth aspects, wherein the electric conductor is a bare conductor, and in the in-slot portions in the slots an electric insulating member is provided between the contact surface and the core of the stator to insulate them each other whereas in the crossover portion outside the slots, the electric conductors are spatially parted and insulated. Since the electric conductors are spatially parted in the crossover portion so that cooling air passes therethrough, thereby providing the effect in that the drying when water is splashed is accelerated to suppress the progress of corrosion, and the effect in that since cooling air impinges upon the electric conductors, heat radiation of the electric conductors without film is enhanced and the temperature of the stator coil is further lowered. Further, since the film is not present, the material cost can be further reduced, and in addition, the producing step of fabricating the conductors by a press can be considerably simplified and the lower cost can be achieved. According to an eighth aspect, there is provided an AC generator for vehicles according to any one of the fifth to seventh aspects, wherein the electric conductor comprises a plurality of substantially U-shaped conductor segments having straight line portions inserted into the slots, one side of the stator core consists of a turn portion of the U-shaped conductor segment, and other straight line portions are arranged and housed into the slots. With this arrangement, the electric connecting portions can be arranged on one side, and as such, the step of producing formation of a winding becomes easy.

According to a ninth aspect, there is provided an AC generator for vehicles according to any one of the fifth to seventh aspects, wherein the electric conductor of the inner and outer layers comprises an internal conductor which is an in-slot portion inserted into the slot, and an external conductor extending to both sides of the internal conductor, the straight line portions of the internal conductor are arranged and housed in the slots. With this arrangement, the shape of the conductor segments is further simplified, whereby the step of fabricating the segment itself is easy, and inexpensive equipment can be employed therefor.

According to a tenth aspect, there is provided an AC generator for vehicles according to any one of the sixth to ninth aspects, wherein a pulley side end in an axial direction of the rotor opposite to the stator and an inner wall surface of an outer peripheral portion of a pulley side intake of the frame are closely opposed to each other. With this arrangement, since the inner wall surface bears a part of a shroud of the fan, the fan performance of a pole core disk portion is increased, and the cooling performance can be similarly achieved and the cost can be reduced without increasing the number of parts and the number of processing steps as compared with the case where the cooling fans are provided on both sides.

According to another aspect of the present invention, each of the electric conductor segments has joint portions at opposite ends of the conductors adjacent to each other, and thickness after welding of said joint portion in both radial and circumferential directions is approximately equal to thickness before welding.

According to another aspect of the present invention, the joint portions adjacent to each other are bare.

As described above, according to the present invention, it is possible to provide an AC generator for vehicles which can prevent corrosion due to water-splashing from outside, which produces no new problem such as a rise of temperature, which is excellent in terms of cost, and which can realize miniaturization and reduction in weight.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE EMBODIMENTS

The AC generator for vehicles according to the present invention will be explained on the basis of the embodiments shown in the drawings.

(First Embodiment)

Figure 1:
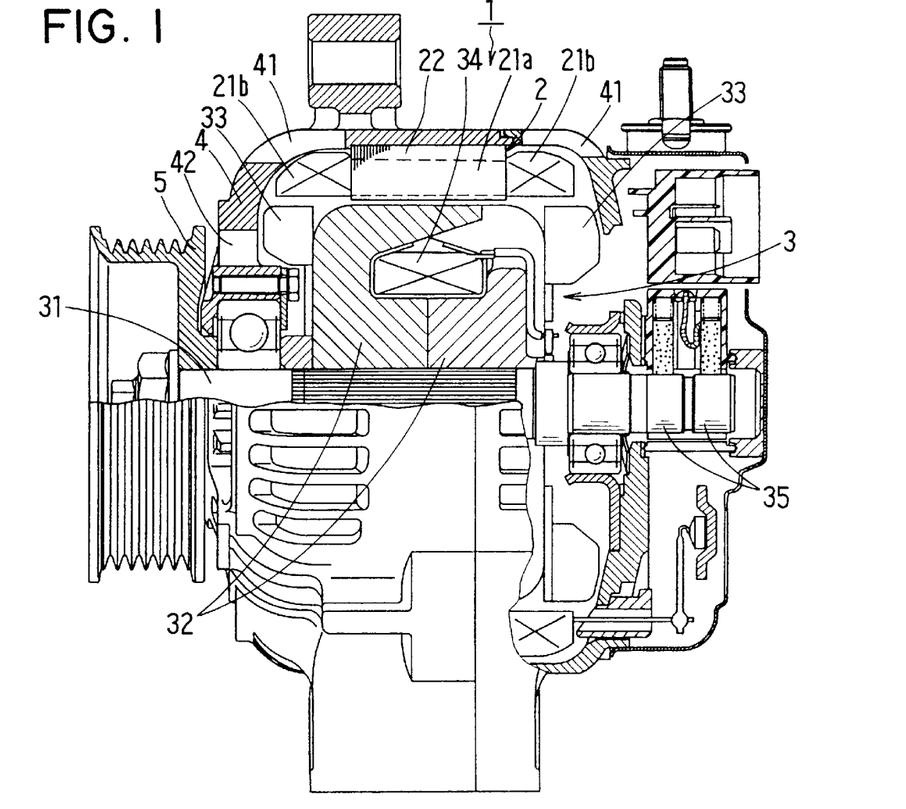
FIG. 1 is a sectional view of main parts of an AC generator for vehicles according to a first embodiment of the present invention.
Figure 2:
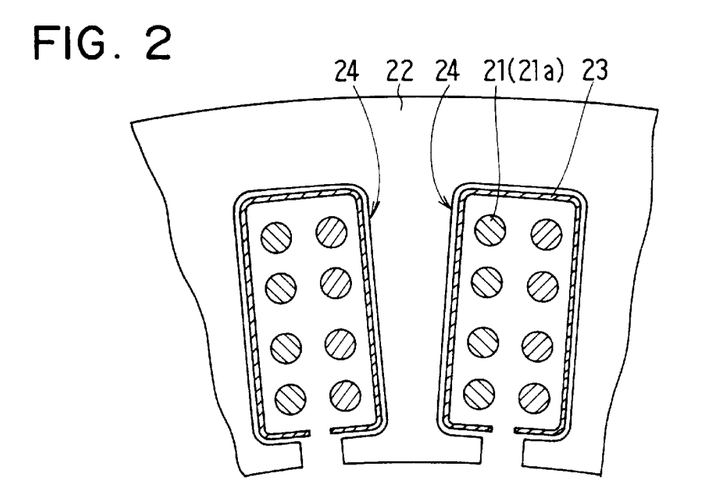
FIG. 2 is a partial sectional view of a stator according to the first embodiment of the present invention.

FIGS. 1 and 2 shows a first embodiment. FIG. 1 shows main parts of the AC generator for vehicles, for cars here, and FIG. 2 is a partial sectional view of a stator in the present embodiment.

An AC generator for vehicles 1 comprises a stator 2 as armature, a rotor 3 as a field, and a frame 4 for supporting the rotor and the stator 2.

The rotor 3 rotates integral with a shaft 31 and is constituted by two sets of Lundell type pole cores 32, a cooling fan 33, a field coil 34, a slip ring 35, and so on. The shaft 31 is connected to a pulley 5 and rotatively driven by the engine (not shown) for running loaded on the car.

The frame 4 is provided with a discharge port 41 for cooling air positioned in the outer periphery opposed to a crossover portion 21*b* of a coil 21 of the stator 2, and an intake 42 on the axial end thereof. The stator 2 is constituted by a stator core 22, a stator coil 21 constituting a winding, an insulator 23 for electrically insulating between the stator core 22 and the stator coil 21, and is supported by the frame 4. The stator core 22 is formed from a laminate of thin steel sheets, and is formed in its inner peripheral surface with a plurality of slots 24 having an opening. An end opening of the slot 24 is set to be narrower than a distance between sides in a circumferential direction in the slot 24.

The stator coil 21 wound comprises a in-slot portion 21*a* housed in a slot 24, and a crossover portion 21*b* for connecting the in-slot portions. A material for an electric conductor used is aluminum, and an occupied area ratio is set to not less than 50% but not more than 80%.

Figure 3B:
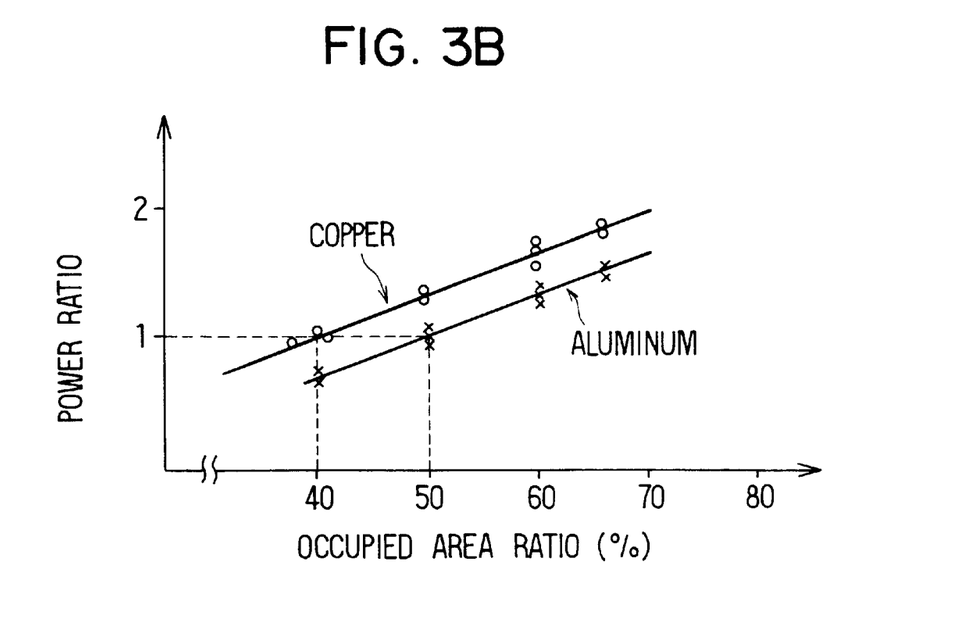
FIG. 3B is a graph showing the results of a ratio of output to space factor.

FIG. 3A shows the results of a salt water atomization test in which the stator 2 of the same physique is varies in space factor. The test is conducted in the procedure such that a voltage of 12 V is applied between the stator coil 21 and the stator core 22 under the salt water condition in accordance with JIS-Z-2371 for a predetermined period of time, and after this, they are dried and insulation performance between the stator coil 21 and the stator core 22, and electric resistance of the stator coil 21 are measured. This procedure is repeated as one cycle till abnormality occurs. With respect to the insulation performance, AC 800 volt is applied between the stator coil 21 and the stator core 22 and between the coils for 5 seconds to examine the presence or absence of occurrence of a short-circuit. Further, with respect to the electric resistance of the stator coil 21, determination is made that when the resistance is changed by not less than 5% with respect to the resistance before the test, the abnormality occurred. As a result, as the occupied area ratio increases, the damage of the winding increases. Therefore, the conventional generator becomes abnormal in average 20 cycles, whereas in the present embodiment, even if the damage of winding increases, a conductive compound is not produced. Therefore, the short-circuit abnormality will not occur between the conductor and the stator core 22 and between the conductors at the same cycle. It is the abnormal mode in which the electric resistance rises as the section reduces due to the progress of corrosion of aluminum itself in 40 cycles. It has been found that the occupied area ratio in order to provide the life more than 20 cycles of the conventional products can be increased more than 80%. FIG. 3B shows the output ratio in the case where in the AC generator for vehicles of the same physique, and in the number of revolution, 4000 rpm at which the temperature of the stator coil 21 is generally highest from the relationship between the output and the cooling performance of the fan, the saturation output value in the case where a conventional copper wire at the occupied area ratio of 40% is 1, and the occupied area ratio is changed and the conductor is made of aluminum. In the case where the electric conductor is made of copper, the frame has no window in the range of approximately 120 degrees as shown in FIGS. 4A and 4B in order to prevent water-splashing from outside. In the case where the electric conductor is made of aluminum as in the present embodiment, the frame in which all the windows are open is used. As can be seen from FIG. 3B, in the present embodiment, if the occupied area ratio is not less than 50%, the output similarly to that of prior art can be obtained.

Since the fan 33 is mounted on the rotor 3, a large amount of air can be applied to the crossover portions 21*b*. Therefore, since the drying of water-splashing to the crossover portion 21*b* is accelerated, the progress of corrosion can be suppressed. Further, since air impinging on the crossover portion 21*b* accelerates cooling, it is possible to lower the temperature of the stator coil 21.

(Second Embodiment)

Figure 5:
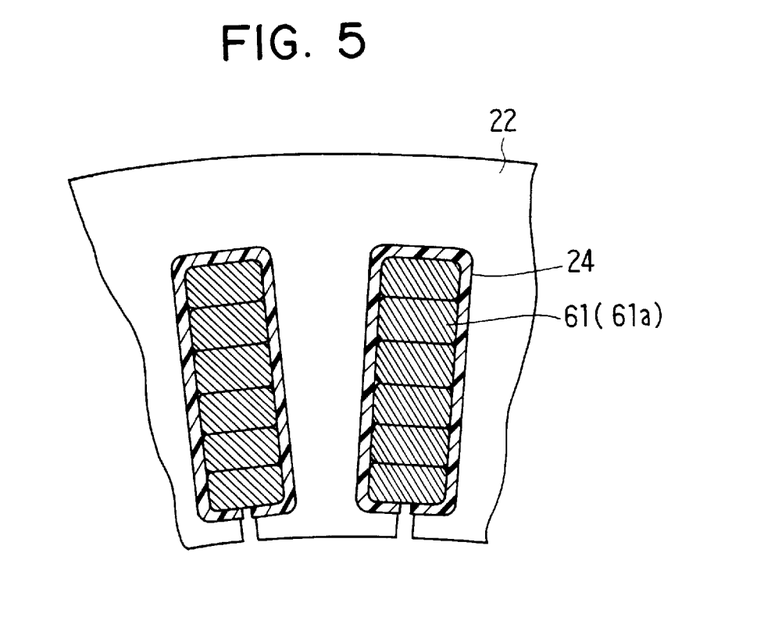
FIG. 5 is a partial sectional view of a stator in the case where a portion of a stator coil positioned within a slot has an substantially rectangular shape along the shape of the slot.

In the first embodiment, the stator coil 21 is indicated by the circle line. However, at least a portion positioned within the slot 24 is substantially rectangular in shape along the slot shape, as shown in FIG. 5, it is easier to increase the occupied area ratio not less than 50%.

Figure 6:
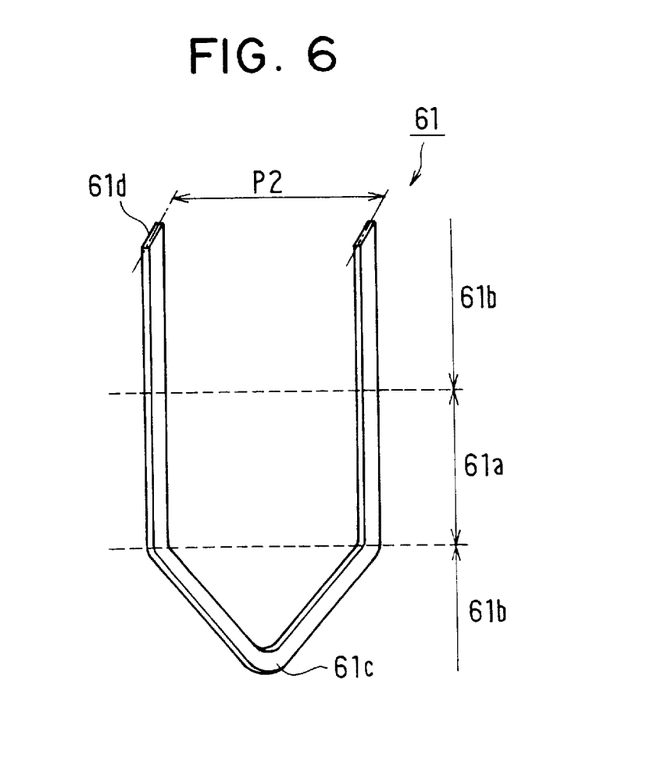
FIG. 6 is a perspective view of a segment in the case where the stator coil is not a continuous line but an substantially U-shaped conductor segment having a turn portion.
Figure 7:
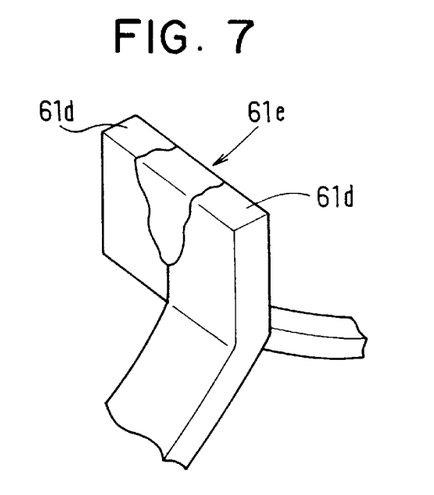
FIG. 7 is a schematic diagram of a joint portion of conductor segments
Figure 8:
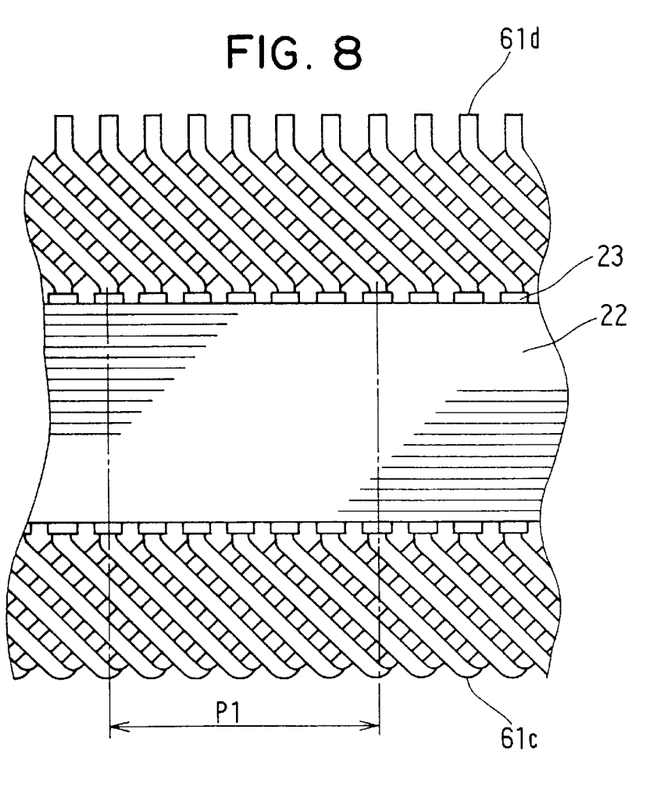
FIG. 8 is a side view of a stator having the substantially U-shaped conductor segment incorporated therein.
Figure 10:
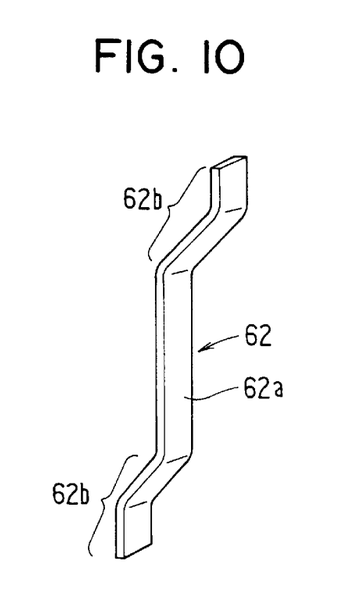
FIG. 10 is a perspective view of an example of another conductor segment.

Further, the stator coil 21 is not a continuous wire, but a substantially U-shaped conductor segment 61 having a turn portion 61*c* is used as shown in FIG. 6. The conductor segment 61 comprises an in-slot portion 61*a* housed in the slot 24, and a crossover portion 61*b* for connecting the in-slot portions. In fabrication, a pitch P2 of the conductor segment 61 is adjusted, beforehand, to a predetermined magnetic pole pitch P1 of the stator slot 24 into which the segment 61 is inserted. The straight line portions 61*a* are inserted in the slots 24 of the stator core 22, and then, the portions of the conductor segment outside the slots 24 on the side opposite the turn portion 61*c* are bent so that one end 61*d* of one of the conductor segments 61 is connected to one end 61*d* of another of the conductor segments 61 to provide a winding as a whole. The connection of the ends 61*d* of the conductor segments 61 may be accomplished by electric conduction such as supersonic deposition, arc welding, and brazing, or mechanical processing means such as caulking. In the arc welding, because the melting point and also heat conductivity of the aluminum are lower than those of copper, the joint portion is specifically welded so that the surrounding portions may not be affected. As shown in FIG. 7, two ends 61*d* of the two conductor segments 61 are formed in parallel with each other, and the welded portion 61*e* is formed at the portion thereof adjacent to each other. Thus, the ends 61*d* after being welded maintains the original shape before being welded. That is, the ends have sharp corners. Therefore, it is easy to maintain the distance between the joint portions. In addition, the surface of aluminum joint portion is covered with aluminum oxide in the same manner as other aluminum portions. The aluminum oxide is an insulating material, and no specific insulator is necessary. Further, the electric conductor is divided into two layers, i.e., an outer layer positioned in the inner part of the slot 24 and an inner layer positioned at an inlet, at least a pair of which are disposed, and the conductors of the inner and outer layers of different slots are connected in series. Since the interference between different phases in the crossover portion of the electric conductor can be avoided, as shown in FIG. 10.

Figure 9:
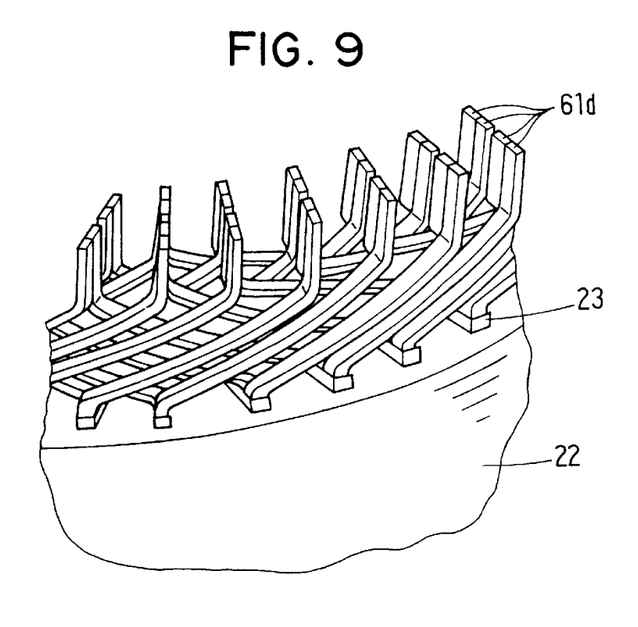
FIG. 9 is a perspective view of a stator having a conductor segment incorporated therein.

As described above, since the conductor segment 61 can be easily disposed in the inner part of the slot 24, the occupied area ratio can be made higher within the slot 24 easily. FIG. 9 shows the case where the number of conductors per slot is four turns, that is, the outer layer and inner layers are two pairs so that joint portions are close to each other. In order to insulate one from another, aluminum welding is preferable. As shown in FIG. 9, even if the number of pairs is changed, the interference between different phases can be similarly avoided. Further, the winding is divided into conductor segments 61 whereby the conductor section is easily formed into a rectangle. Since the conductor can be prepared by a press or the like, materials and processing cost can be reduced.

Because the specific gravity of iron, which is the material of stator core and that of copper which is the material of stator coil is almost equal, it is difficult to be separated if they are melted. However, the specific gravity of aluminum is about one third of that of iron, and the separation aluminum from iron is easy if they are melted. This is a merit of the material recycling.

(Variants)

While in the second embodiment, the turn portion 61c of the conductor segment 61 is provided on one side of the stator, it is noted that this may be divided, and both sides may be joined by welding or the like. A conductor segment 62 in this case is shown in FIG. 10. The conductor segment 62 comprises an in-slot portion 62a which is a substantially straight line portion to be inserted into the slot 24, an a crossover portion 62b which is a substantially straight line portion extending to both axial sides of the stator core 22 on both sides of the internal conductor, the crossover portion 62b having an angle and a length around the distance about half of the magnetic pole pitch. Also in this case, the occupied area ratio within the slot 24 can be easily raised of course, and this can be simplified as compared with the substantially U-shape of the conductor segment 61, thus making the manufacturing step of the segment itself easy, and enabling fabrication with an inexpensive equipment.

Alternatively, a bare conductor without film is used as an electric conductor, and as shown in FIG. 10, in the in-slot portion 21a within the slot 24, an electric insulating member 23 is disposed between the contact surface of the electric conductor and the stator core 22 to insulate them, and in the crossover portion outside the slot 24, the electric conductors are spatially parted to insulate between the conductors. At this time, since the cooling air passes through the space of the crossover portion, drying in case of water-splashing is further accelerated to suppress the progress of corrosion, and since cooling air impinges upon the electric conductor, the heat radiation of the electric conductors without the film as well as the cooling properties of the electric conductors are further improved. Further, since no film is provided, the material cost can be further reduced. The conductor can be fabricated by a press of course, and since no scratch of film is produced, the production step can be considerably simplified and the cost can be lowered.

Furthermore, the electric conductor may be of a composite conductor of a rectangular conductor and a round wire. For example, in the case where the inside of the slot 24 is a rectangular conductor and the outside of the slot 24 is a round wire, the effect of improvement in cooling performance caused by higher space factor in the slot 24 and enhancement of heat transfer of a stator core 22 is similarly obtained. Conversely, if the inside of the slot 24 is a round wire, and the outside of the slot 24 is a rectangular and substantially flat conductor, a clearance between the conductors in the coil ends can be sufficiently secured, and the ventilation resistance to cooling air can be reduced to enhance the cooling performance.

Figure 11:
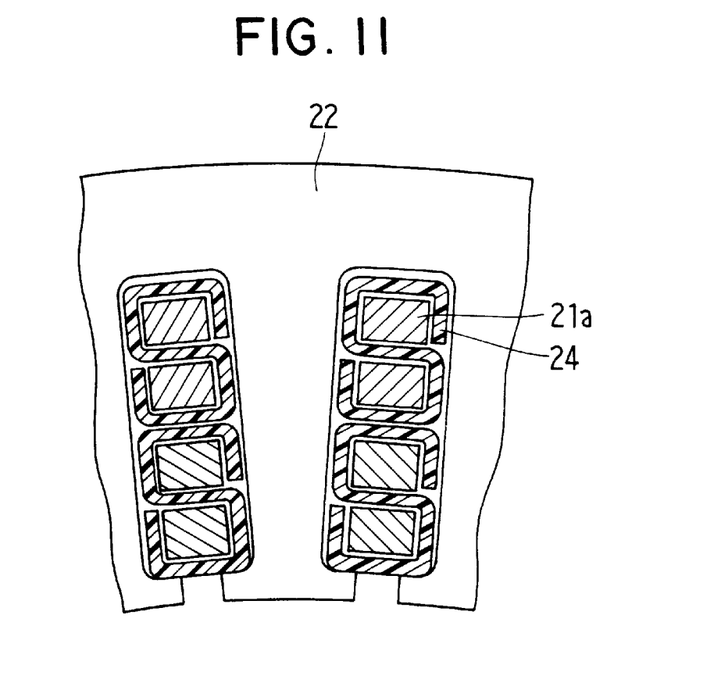
FIG. 11 is a partial sectional view of a stator in the case where an electric conductor is a bare conductor.
Figure 12:
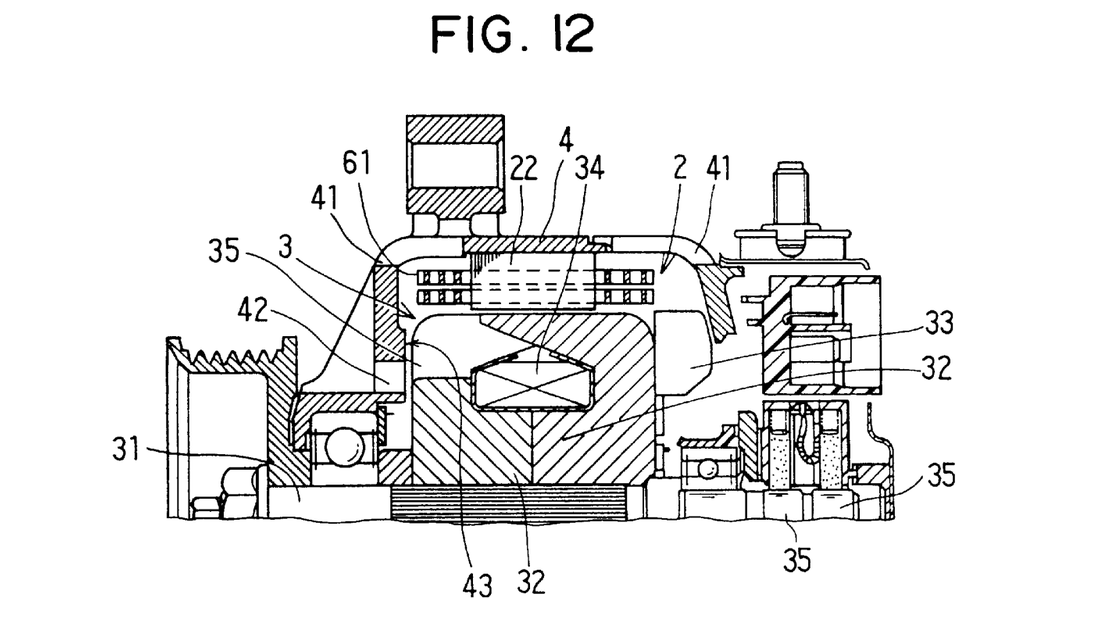
FIG. 12 is a partial sectional view of an AC generator for cars in which a pole core disk portion is a cooling fan.
Figure 13:
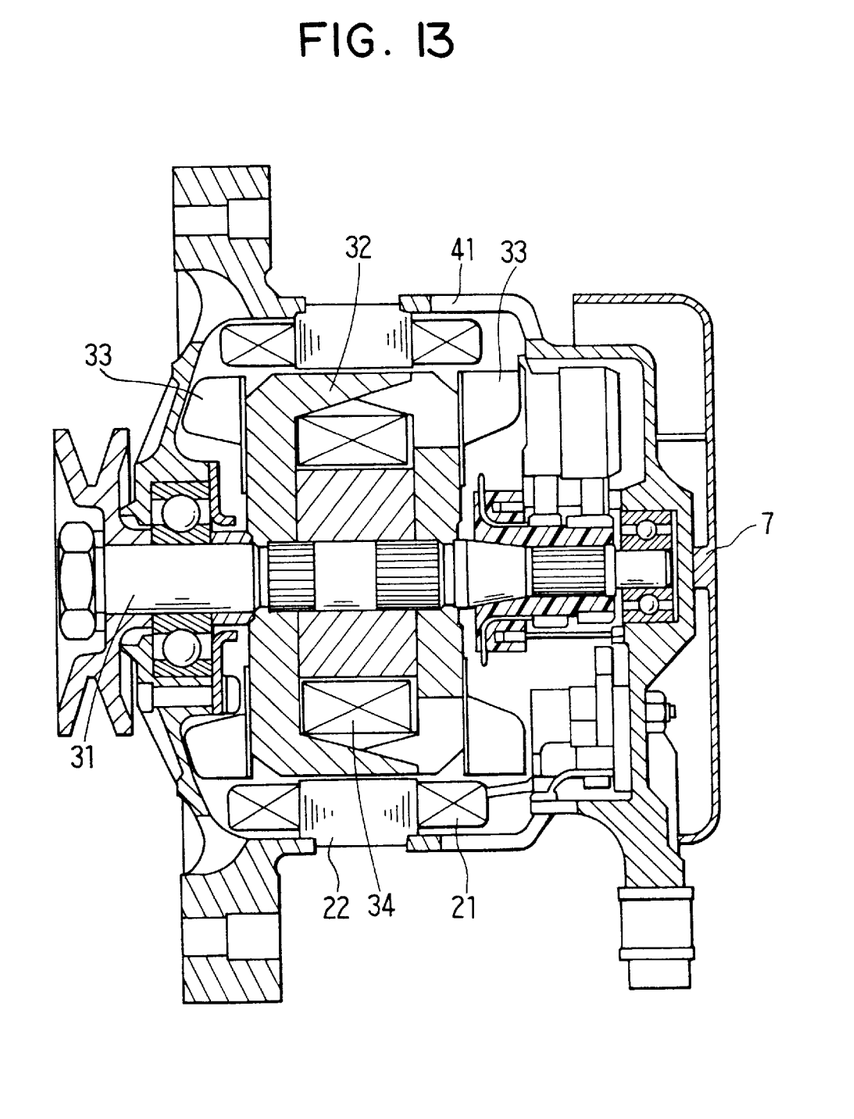
FIG. 13 is a sectional view showing an AC generator for cars having a conventional drip proof cover.

Alternatively, as shown in FIG. 11, the inner wall surface 43 in the outer peripheral portion of the intake 41 of the frame is made close to and opposed to the end in which a cooling fan of the rotor is not installed. In this case, since the inner wall surface 43 of the frame bears a part of a shroud of the fan, the fan performance of the pole core disk portion 31 is improved. Thereby, as compared with the case where cooling fans are provided on both sides, the cooling performance can be equally achieved without increasing the number of parts and the number of processing steps, and the generator can be further miniaturized.

According to the embodiments described above, it is possible to provide an AC generator for vehicles which can prevent corrosion due to water-splashing from outside, which produces no new problem such as a rise of temperature, which is excellent in terms of cost, and which can realize miniaturization and reduction in weight.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. An AC generator for vehicles including a field rotor; a stator having a laminated core with a plurality of slots; a plurality of electric conductor segments inserted in the slots; an electric insulator disposed around said field rotor; and a frame for supporting the rotor and the stator, wherein:

each of said electric conductor segments is made of aluminum and includes an in-slot portion disposed in one of said slots and a crossover portion for connecting said in-slot portion to another in-slot portion of said conductor segments disposed in another of said slots to provide a winding as a whole, said frame is disposed around said crossover portions of the electric conductor segments, portions of said frame substantially in an outer diametrical direction opposite to said crossover portions have a plurality of windows substantially in a whole periphery, said crossover portions of said conductor segments are spatially parted from one another to form cooling air passages which receive cooling air from an inner periphery of said stator, and said rotor comprises a cooling fan on an axial end of said rotor.

2. An AC generator for vehicles according to claim 1, wherein an occupied area ratio of a sectional area of each of said in-slot potion of said electric conductor segments with respect to a sectional area of said slot is less than 80% and not less than 50%.

3. An AC generator for vehicles according to claim 1, wherein at least each of the in-slot portions of said electric conductor segments has a substantially rectangular shape which fits into said slots.

4. An AC generator for vehicles according to claim 3, wherein each of said electric conductor segments comprises a U-shaped conductor segment and said in-slot portion comprises parallelly extending straight portions.

5. An AC generator for vehicles according to claim 4, wherein each of said electric conductor segments has joint portions at opposite ends of said conductors adjacent to each other, and thickness after welding of said joint portion in both radial and circumferential directions is approximately equal to thickness before welding.

6. An AC generator for vehicle according to claim 5, wherein said joint portions adjacent to each other are bare.

7. An AC generator for vehicles according to claim 1, wherein said electric conductor segments are divided into two layers, outer layers which are disposed in an inner portion of said slots and inner layers which are disposed at inlets of said slots, wherein each of said conductor segments in said inner portion of one slot is connected to one of said conductor segments at said inlets of another slot to form a series coil winding.

8. An AC generator for vehicles according to claim 7, wherein said crossover portions respectively extend from both sides of said slots.

9. An AC generator for vehicles according to claim 7, wherein a pulley side portion of said rotor and an peripheral portion of said frame having air-intakes are disposed closely to each other.

10. An AC generator for vehicles according to claim 1, wherein each of said electric conductor segments comprises a naked conductor, an electric insulating member is interposed between said conductor segments in said in-slot portions as well as between inner walls of said slot and said electric conductor segments, and said crossover portions are spatially parted.

11. An AC generator for vehicles according to claim 1, wherein:

an occupied area ratio of a sectional area of each of said in-slot portion of said electric conductor segments with respect to a sectional area of said slot is less than 80% and not less than 50%, and said electric conductor segments are divided into two layers, outer layers which are disposed in an inner portion of said slots and inner layers which are disposed at inlets of said slots, wherein each of said conductor segments in said inner portion of one slot is connected to one of said conductor segments at said inlets of another slot to form a series coil winding.

\* \* \* \* \*